United States Patent [19]

Kadis

[11] Patent Number: 4,691,902
[45] Date of Patent: Sep. 8, 1987

[54] SELF-LUBRICATING DIE CYLINDER

[75] Inventor: Paul M. Kadis, Chardon, Ohio

[73] Assignee: Teledyne Industries, Inc., Brecksville, Ohio

[21] Appl. No.: 723,036

[22] Filed: Apr. 15, 1985

[51] Int. Cl.⁴ .............................................. F16F 9/00
[52] U.S. Cl. .................................. 267/119; 92/142; 92/152; 184/18
[58] Field of Search ............ 267/119, 130, 113, 64.11, 267/64.14, 64.15, 64.26, 64.28; 188/268; 184/18, 6.26, 58, 55 A, 54, 56 A, 57, 6.17; 92/142, 154, 156, 153; 91/46

[56] References Cited

U.S. PATENT DOCUMENTS

| 918,392 | 4/1909 | Talcott | 184/18 X |
|---|---|---|---|
| 1,263,928 | 4/1918 | Ridgway | 183/18 |
| 1,845,933 | 2/1932 | Penberthy | 91/46 |
| 1,960,070 | 5/1934 | Sellers | 184/18 |
| 2,527,657 | 10/1950 | Rowletge et al. | 92/154 X |
| 2,781,632 | 2/1957 | Meijer | 184/6.26 X |
| 2,815,254 | 12/1957 | Soman et al. | 267/119 |
| 2,836,349 | 5/1958 | Scheldorf | 92/156 X |
| 4,044,859 | 8/1977 | Wallis | 92/154 X |
| 4,423,859 | 1/1984 | Muller | 267/119 |

FOREIGN PATENT DOCUMENTS 497593 2/1951 Belgium .

Primary Examiner—Duane A. Reger
Assistant Examiner—Matthew C. Graham
Attorney, Agent, or Firm—Tarolli, Sundheim & Covell

[57] ABSTRACT

A self-lubricating die cylinder assembly is provided containing a cylinder, piston, expansion reservoir and working chamber. A lubricating oil recirculation means is provided to transport oil between the working chamber and the expansion reservoir during each of the piston strokes. A flow restrictor is provided to create a pressure differential between the two chambers during movement of the piston thus creating a jet mixture of compressible working fluid and lubricating oil spraying onto the walls of the cylinder.

11 Claims, 5 Drawing Figures

SELF-LUBRICATING DIE CYLINDER

FIELD OF INVENTION

The present invention relates to fluid cylinders, and, more particularly, to fluid springs used between die members of a stamping press.

BACKGROUND OF INVENTION

The service life and reliability of a nitrogen die cylinder is directly related to the ability of the high pressure dynamic seal to maintain minimum leakage. The ability of the high pressure dynamic seal to maintain its proper function and operation has been found to be greatly affected by the amount and temperature of the lubricating oil film over which the seal travels. Surface contact wear and therefore leakage of the seal occurs rapidly when the seal is allowed to travel against a cylinder wall lacking an adequate film of lubricating oil.

Most nitrogen die cylinder only receive a film of lubricating oil on the cylinder walls during assembly. This can be supplemented by installing an oil soaked foam wiper in a groove next to the seal. However, with time, gravity tends to pull the oil film off of the cylinder. The seal itself, on each stroke, will push excess oil off the cylinder wall making the film even thinner after each stroke. The oil soaked film wiper can maintain the oil film only for a limited time before gravity and the wiping action of the seal displace the oil to areas in the nitrogen die cylinder where the oil no longer is of any benefit.

Others have suggested using the compressible working fluid (i.e., nitrogen) passing through an oil soaked sponge-like material to entrain oil for deposit on cylinder walls. See Wallis U.S. Pat. Nos. 4,005,763; 4,044,859; 4,076,103; and 4,342,448. However, in each case, the nitrogen die cylinder requires the oil to be entrained in the nitrogen working fluid. The Wallis systems do not rely on positive displacement or pressure differential to create a flow of lubricating oil. Moreover, the lubricating oil is only circulated in one direction, and thus, oil eventually collects in areas of the cylinder assembly where the oil is of no benefit.

Another approach is shown in Soman U.S. Pat. No. 2,815,254 which discloses an air cylinder having a lubricating means. However, the lubricating means relies on a direct pumping action and only delivers lubricating oil to one spot on the circumference of the seal. Soman does not disclose any working gas flow control device, nor does it permit the working gas to be mixed with the lubricating oil.

High temperatures can impair the lubricating properties of the oil film. A typical dynamic high pressure seal has a very small contact area against the cylinder wall. High gas pressure in die cyllinders can cause very high unit loading on the seal and therefore generate high temperatures from friction during movement of the seal. A thin lubricating oil film is heated by this friction which can cause the oil to oxidize or break down. Since the seal slides over the same oil film on each stroke, it may not allow the oil sufficient time to dissipate heat.

SUMMARY OF INVENTION

The present invention overcomes the deficiencies noted in the prior art by providing a self-lubricating die cylinder assembly having a lubricating oil recirculation means. The lubricating oil recirculation means not only recirculates the oil but sprays a coating of oil on the cylinder walls during each complete cycle of the piston. The lubricating oil recirculation means will spray a jet mixture of compressible working fluid and lubricating oil onto the cylinder walls by means of a controlled pressure differential of the compressible working fluid while the piston is moving during the expansion stroke of the work cycle.

The lubricating oil is transferred during each stroke of the piston between a piston/cylinder working chamber and an expansion reservoir. A flow restrictor is provided in or forms a part of the passage or passages between the working chamber and the expansion reservoir to create a pressure differential during movement of the piston. The pressure differential is responsible for the lubricating oil recirculation and in combination with the flow restrictor provides a jet mixture spray of compressible working fluid and lubricating oil for lubrication of the cylinder walls.

In the preferred form of the present invention, two passages are provided between the working chamber and the expansion reservoir—one passage being the working fluid passage and the other passage being primarily the oil passage. Although both oil and the working fluid can pass through both of the passages in the preferred form, the differential pressure created by a venturi or flow restrictor in the working fluid (nitrogen) passage permits most of the lubricating oil to pass through the oil passage.

Further embodiments of the present invention also permit the die cylinders to be used in either the lower or upper parts of a stamping press, and one embodiment comprises a self-contained die cylinder having both a working chamber and an expansion reservoir in a self-contained assembly.

A major advantage of the present invention is that it recirculates oil during each stroke of the cylinder assembly and greatly prolongs the life of the die cylinder. The present invention provides this improved recirculation of oil without the use of any moving parts and without relying on external energy or devices. Further advantages and features of the present invention will be apparent upon review of the description of the preferred embodiments.

BRIEF DESCRIPTION OF DRAWINGS

In the specification.

DETAILED DESCRIPTION OF PREFERRED EMBODIMENTS

Figure 1:
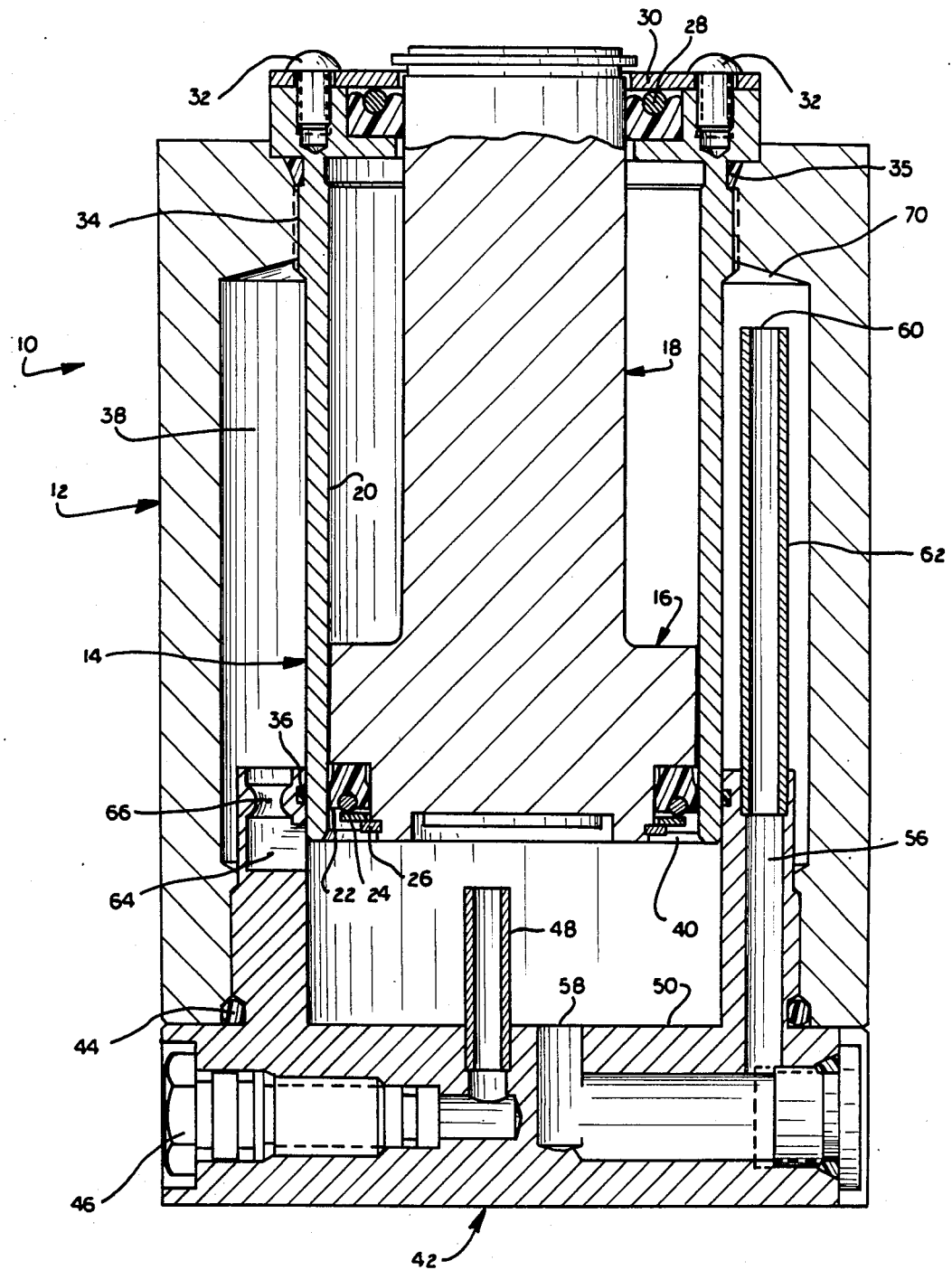
FIG. 1 is a cross sectional view of a preferred self-contained nitrogen die cylinder in accordance with the present invention.

A self-contained nitrogen die cylinder 10 is shown in FIG. 1. For the sake of convenience, the working fluid will sometimes be referred to as "nitrogen" although it is apparent that other working fluids could be employed in the present invention. The nitrogen die cylinder 10 comprises a body 12 and a piston/cylinder unit 14 contained therein.

The piston/cylinder unit 14 as employed in the present invention may be any suitable construction as previously employed for nitrogen die cylinders. The unit 14 comprises, in this preferred structure, a piston 16 and a piston rod 18. The piston 16 is mounted for reciprocal motion within a cylinder liner 20. A high pressure dynamic seal, e.g., U-cup, 22 is provided to seal the piston 16 with the cylinder wall 20. The high pressure dynamic seal 22 is held in place on the periphery of the piston 16 by a washer 24 and a retaining ring 26.

The outer surface of the piston rod 18 slides against an upper stationary U-cup seal 28. The upper stationary seal 28 is contained in the upper portion of the cylinder liner 20 and retained therein by a bearing retaining cap 30. The bearing retaining cap 30 is secured to the cylinder assembly 20 by suitable fasteners 32. The seals 28 and 22 may take on a variety of different forms which have been used in nitrogen die cylinders. One such suitable seal is illustrated in Balazs et al. U.S. application Ser. No. 382,939, filed May 22, 1982, which is hereby incorporated by reference.

The piston/cylinder unit 14 is secured to the body 12 by any suitable means such as threaded engagement using threads 34 and seal 35. The outer surface of the cylinder assembly 20 at its lower end is sealed against the body 12 by an O-ring 36. When the piston/cylinder unit 14 is secured in the body 12, an expansion reservoir 38 is created between the outer surface of the cylinder liner 20 and the inner surface of the body 12. A working chamber 40 is created between the piston and cylinder liner.

The body 12 has an end cap 42 sealed against the side walls of the body 12 by a suitable O-ring seal 44. The end cap 42 is provided with a charge tube 46 for charging the die cylinder assembly with a compressible working fluid, such as nitrogen. The charge tube 46 has a standpipe 48 which extends into a well 50 in the bottom of cylinder assembly 10. The standpipe 48 of the charge tube extends upwardly into the well 50 so that its upper end is above the level of any lubricating oil in the well 50 but below the lowest travel point of the piston 16.

An oil passage 56 extends between the expansion reservoir 38 and the working chamber 40. The lubricating oil passage 56 has an inlet 58 leading into the well 50 in the lower part of the working chamber 40 and an outlet 60 leading into the expansion reservoir 38. As shown in the preferred form in FIG. 1, the oil passage 56 contains a raised standpipe 62 leading to the "top" of the expansion reservoir 38. The purpose of this standpipe 62 will be explained in more detail later.

A second passage 64 is also provided between the expansion reservoir 38 and the working chamber 40. The second passage is termed the compressible working fluid passage or nitrogen passage. In a preferred form, the nitrogen passage 64 can contain a venturi or flow restrictor 6 in the passage.

As explained in more detail below, although the passages 64 and 56 have been, respectively, termed the working fluid passage and the lubricating oil passage, the function of the present device permits a combination of both compressible working fluid lubricating oil to pass through both of the passages during movement of the piston.

Figure 2:
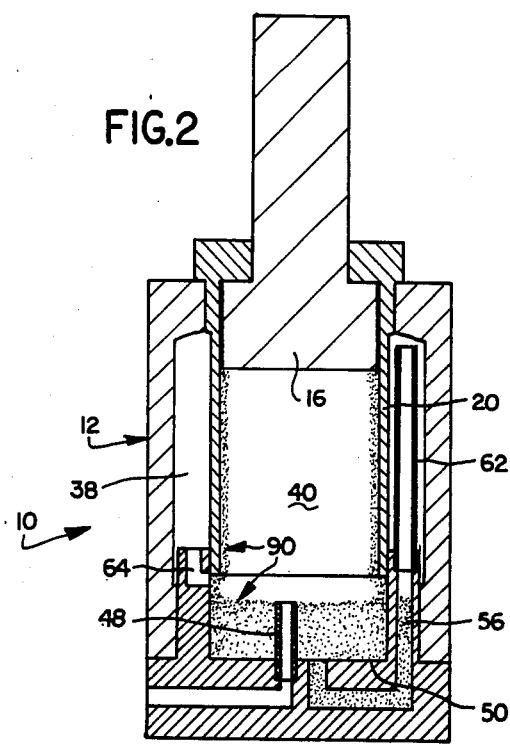
FIGS. 2–4 are schematic cross sectional illustrations of a die cylinder in accordance with the present invention showing the lubricating oil recirculation.
Figure 3:
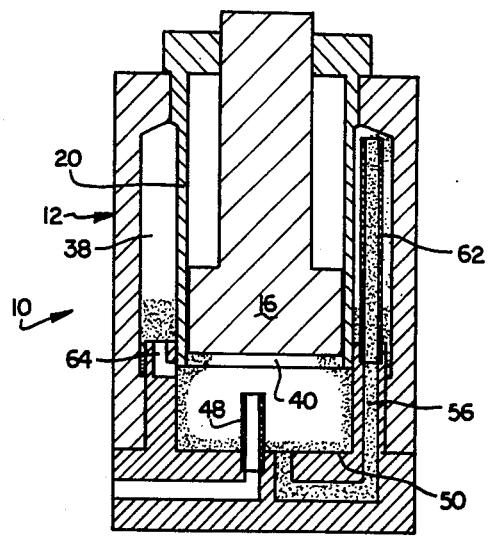
Figure 4:
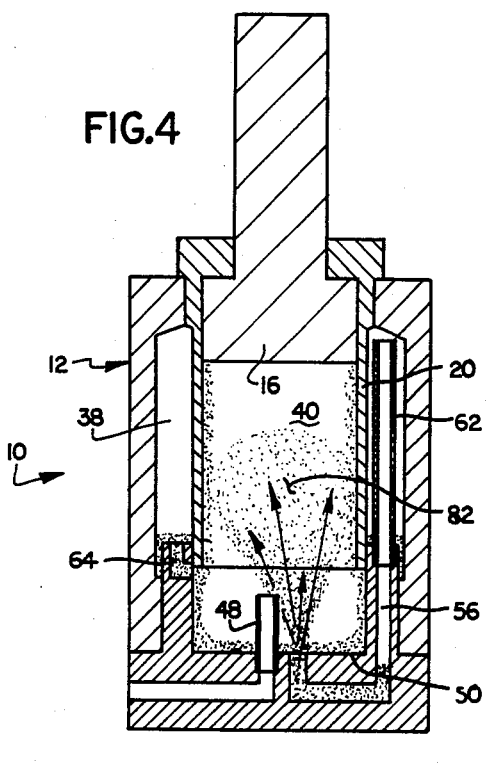

The operation of the die cylinder assembly of FIG. 1 will now be described with reference to the schematic cross sections shown in FIGS. 2-4. The schematic cross section of FIG. 2 shows the die cylinder assembly in the die-open position or the expanded position. The lubricating oil 90 is shown as a film on the walls of the cylinder liner 20 and in a pool in the well 50. FIG. 3 is a schematic cross section of the die cylinder assembly in the die-closed position or the compressed position. FIG. 4 shows the die-cylinder assembly with the piston having just expanded to the die-open position.

With resepct to FIG. 2, the working chamber 40 and the expansion reservoir 38 are filled with a compressible working fluid, such as nitrogen. The nitrogen is under high pressure, such as about 200 psi to about 2,000 psi. The pressure between the expansion reservoir 38 and the working chamber 40 are equal since the pressure is allowed to equalized through the nitrogen orifice 64 and the oil passage 56.

FIG. 3 shows the piston 16 at the end of its stroke and thus in the die-closed or compressed position. As the gas in the working chamber 40 is being compressed by the piston 16, the gas will travel through any passage to get to the expansion reservoir 38 in order to attempt to equalize the pressure therebetween. Most of the working fluid would travel through the working fluid passage 64. However, the working fluid passage 64 or venturi 66 are specifically designed to create a small resistance to gas flow; they are sized in a manner discussed below and are smaller than oil passage 56. Because of this resistance, some of the working fluid will travel through the lubricating passabe 56. As the piston 16 travels on the cylinder walls 20, the high pressure dynamic seal will wipe some of the oil film off of the cylinder wall and force it into the bottom well 50, and some of the oil will be pushed by the gas pressure into the expansion reservoir 38.

When the piston 16 has reached the limit of its travel, it will stop compressing the working fluid in the working chamber and allow the gas pressure to again equalize between the working chamber 40 and the expansion reservoir 38. Any excess lubricating oil wiped off of the cylinder walls 20 will be maintained either in the well 50 or the expansion reservoir 38.

FIG. 4 shows the piston 16 at the end of its stroke in the die-open or expanded position. The high internal working fluid pressure pushes the piston to follow the press motion. As the piston 16 starts to move away from the position shown in FIG. 3, the gas pressure in the working chamber 40 begins to drop. The working fluid pressure in the expansion reservoir 38, being at a higher pressure, will try to equalize by allowing the flow of working fluid back into the working chamber 40.

The working fluid will flow from the expansion reservoir 38 into the working chamber 40 through the working fluid passage 64. Again, because the working fluid passage 64 is designed to create a small amount of resistance to gas flow, some working fluid will also travel through the lubricating passage 56. However, before the working fluid can travel through the lubricating passage, and to some extent also the working fluid passage 64, the working fluid must first push any lubricating oil in its path into and then through the passages. If the passages are properly sized, the working fluid pressure in the expansion reservoir 38 should push the lubricating oil through the passages at a high velocity. Once the lubricating oil leaves the passages at aa high velocity, the lubricating oil will continue to travel through the working chamber 40 and spray a heavy film of oil onto the cylinder walls. As shown in FIG. 4, a jet mixture of compressible working fluid and lubricating oil 82 is sprayed onto the walls of the cylinder liner 20. Lubricating oil will continue to be sprayed onto the cylinder walls until most of the oil is flushed out of the lubricating passage or the pressure between the working chamber 40 and the expansion reservoir 38 is equalized.

The jet mixture action described with respect to FIGS. 2-4 of the present invention has many advantages and features over the prior art. The die cylinder assembly of the present invention does not have any moving parts and does not rely on external energy to circulate the lubricating oil. Seal life is improved, and wear and galling of the cylinder wall is reduced. The lubricating oil is recirculated in the present invention which not only conserves the lubricating oil but also insures that a supply of lubricating oil will always be available to lubricate the cylinder walls. In prior art devices, particularly the entrained devices, the lubricating oil is used only once and needs to be replenished—otherwise the source of lubricating oil will be depleted. The expansion reservoir of the present invention also acts as a heat sink and cools the lubricating oil somewhat when it is transferred into the expansion reservoir. This prevents the oil from reaching too high a temperature and thus risking oxidation or breakdown. Moreover, the jet spray mixture of the present invention sprays lubricating oil onto the entire cylinder wall surface and does not rely on directional flow of lubricating oil through a single passage onto a small portion of the cylinder wall as shown in the prior art. For example, in Soman, the lubricating oil is delivered to only one point on the cylinder wall, which is also true of many of the Wallis devices. Furthermore, the present invention does not rely on entrainment or pumping action, but rather relies on a pressure differential to create a jet spray mixture.

The lubricating oil standpipe 62, as shown in FIG. 1, permits the die cylinder assembly 10 to be used in either the lower or the upper part of a stamping press. If the die cylinder assembly 10 is used in the upper part of a die stamping press (i.e., in an inverted position), any lubricating oil in the expansion reservoir 38 will flow to the lower surface 70 of the expansion reservoir (FIG. 1). In the upper position, during the closing of the stamping press, most of the lubricating oil passes through the working fluid passage 64. On the return stroke, the jet spray mixture is caused by lubricating oil and gas passing through the lubricating passage 56. However, the standpipe 62 must be sufficiently long enough to reach to the lubricating oil puddled near surface 70. The standpipe 62 also contributes to the cooling of the oil by causing oil to flow into the expansion reservoir and down the side walls thereof dissipating heat.

Figure 5:
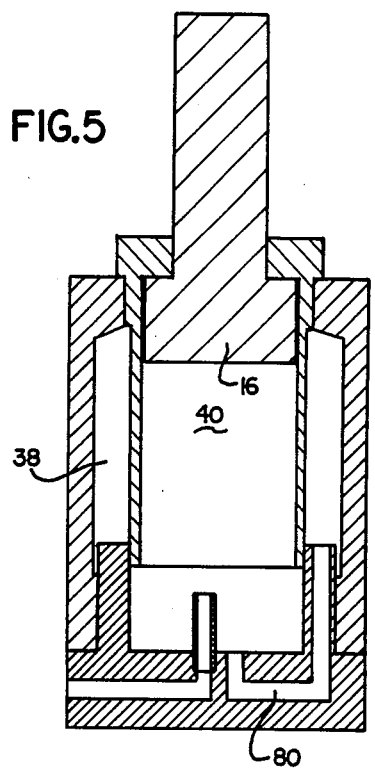
FIG. 5 is a cross sectional view of a further embodiment of the present invention.

Of course, the standpipe 62 could be eliminated if the die assembly shown in FIG. 1 was only to be used in the lower position. Such a device is shown in FIG. 5, which also eliminates the nitrogen passage. In the embodiment in FIG. 5, a single passage 80 is provided between the working chamber 40 and the expansion reservoir 38. The passage 80 is sized to create the pressure differential during movement of the piston as previously discussed. On the return stroke of the piston to its upper position as shown in FIG. 5, the pressure differential between the working chamber 40 and the expansion reservoir 38 created by the passage 80 will cause the lubrication oil to be mixed with the compressible working fluid travelling through the passage 80 attempting to equalize the pressure between the two chambers. The lubricating oil will travel as such a velocity as to create a jet spray mixture as the compressible working fluid and the lubricating oil exit into the working chamber 40 from passage 80.

The present invention contemplates further embodiments than those illustrated in FIGS. 1-5. For example, a conventional nitrogen die cylinder can be connected to an external expansion reservoir with a nitrogen gas passage and a lubricating oil passage. A flow restrictor would be placed in or form part of the nitrogen passage to create the needed pressure differential as discussed above. This external reservoir can be placed with respect to the passages to be used in either the upper or the lower press positions.

Another embodiment involves a conventional nitrogen die cylinder installed in a manifold system, which has an expansion reservoir contained in the manifold. The expansion reservoir would be connected to the nitrogen die cylinder again by a working fluid passage containing a flow restrictor and a lubricating oil passage. Positioning of the expansion reservoir in the manifold can permit this embodiment to be used either in the upper or the lower press positions.

Further modifications within the scope of the present invention are also apparent. For example, appropriate placement of a check valve in either the working fluid passage or the lubricating passage could be used to provide greater segregation in the flow of the working fluid and the lubricating oil. The use of a check valve would also permit or restrict use of a die cylinder to either the upper or lower position.

As noted above, the jet spray mixture of the present invention is created by the differential pressure between the working chamber and the expansion reservoir. The differential pressure can be created during movement of the piston by a properly sized orifice between the two chambers. The flow restrictor can be a venturi, such as the venturi 66 shown in FIG. 1, or it can be a properly sized passage as shown in FIGS. 2-5.

The passage or passages between the expansion reservoir and the working chamber cannot be too large or a pressure differential will not be created. The passage or passages cannot be too small or else the increased pressure will not permit the proper travel of the piston, thus destroying the stamping operation and the piece to be stamped.

The proper sizing of the passage containing or acting as the flow restrictor means can be determined by any one of a number of methods. One such method will now be described. Calculation of the diameter of the passage between the expansion reservoir and the working chamber should be sized for the piston's slowest speed and shortest stroke. Calculating the maximum diameter of the passage can be made in accordance with the following formula:

$$D = \sqrt{\frac{W \times \sqrt{53.34 \times T_{abs.}}}{6.30 \times C_d \times P_1 \times \sqrt{3.5 \left[ \left(\frac{P_1}{P_2}\right) 1.429 - \left(\frac{P_2}{P_1}\right) 1.714 \right]}}}$$

In the above formula,

D = diameter of passage.

W = volume of compressible working fluid displaced per stroke times strokes per minute divided by 1,356,480 (lbs/sec).

$T_{abs.}$ = absolute temperature in degrees Rankine.

$C_d$ = orifice coefficient (described below).

$P_1$ = upstream pressure in pounds per square inch absolute, i.e., the charge pressure.

$P_2$ = downstream pressure in pounds per square inch absolute, i.e., $P_1 - P_R$.

$P_R = H \times 0.036 \times SG$.

H = height of liquid column.

SG = specific gravity of lubricating liquid.

The orifice coefficient $C_d$ is experimentally determined and can be obtained from a variety of handbooks, e.g., *Fluid Power, Theory And Applications*, James A. Sullivan, Reston Publishing Company, Inc., Reston, Va., page 124.

In using the above formula or a similar formula or method, a differential pressure can be created between the working reservoir and the expansion reservoir. Either the size of the passage or a venturi can be used to create the differential pressure. The spraying action of the oil, and the recirculation can be enhanced, by increasing the pressure differential created by the venturi or passage. This is easily accomplished by sizing the nitrogen passage or venturi, somewhat smaller than the theoretical size determined by the above formula.

What is claimed is:

1. A cushion assembly for use in a press operable between open and closed conditions, said cushion assembly comprising a piston, a cylinder which cooperates with said piston to at least partially define a variable volume working chamber, said piston being movable relative to said cylinder from an extended position to a retracted position to contract the variable volume working chamber upon operation of the press from an open condition to a closed condition, said piston being movable relative to said cylinder from the retracted position to the extended position to expand the variable volume working chamber upon operation of the press from the closed condition to the open condition, reservoir means for holding a body of lubricating liquid at a fluid pressure which is less than and which increases at substantially the same rate the fluid pressure in the working chamber increases during movement of said piston from the extended position toward the retracted position during operation of the press from the open condition toward the closed condition, for holding the body of lubricating liquid at a relatively high fluid pressure which is at least substantially equal to a relatively high fluid pressure in working chamber when said piston is in the retracted position and the press is in the closed condition, and for holding at least a portion of the body of lubricating liquid at a fluid pressure which is greater than the fluid pressure in the working chamber during at least a portion of the movement of said piston from the retracted position toward the extended position during operation of the press from the open condition toward the closed condition, said reservoir means holding the body of liquid with an upper surface of the body of liquid spaced from the working chamber and exposed to the fluid pressure in said reservoir means, passage means for conducting a flow of lubricating liquid from the body of lubricating liquid in said reservoir means along a flow path which extends from a location beneath the upper surface of the body of lubricating liquid in said reservoir means to said working chamber under the influence of the fluid pressure in said reservoir means upon movement of said piston from the retracted position toward the extended position during operation of the press from the closed condition toward the open condition and for conducting a flow of lubricating liquid from said working chamber back along the same flow path toward said reservoir means during movement of said piston from the extended position toward the retract position during operation of the press from the open condition toward the closed condition, said passage means including outlet means for directing a spray of lubricating liquid into the working chamber upon movement of said piston from the retracted position toward the extended position during operation of the press from the closed condition toward the open condition.

2. A cushion assembly as set forth in claim 1 wherein said reservoir means includes standpipe means for holding a body of lubricating liquid when said cushion assembly is in a first orientation and for extending from a location above the upper surface of a body of lubricating liquid in said reservoir means and through the upper surface of the body of lubricating liquid to a location beneath the upper surface of the body of lubricating liquid in said reservoir means when said cushion assembly is in a second orientation.

3. A cushion assembly as set forth in claim 1 wherein said reservoir means includes first and second end walls, said piston being movable in a direction away from said first end wall toward said second end wall upon movement of said piston from the retracted position toward the extended position during operation of the press from the closed condition toward the open condition, said passage means being connected in fluid communication with an opening which is spaced from said first end wall and is adjacent to said second end wall.

4. A cushion assembly as set forth in claim 1 wherein said cushion assembly is adapted to be mounted in the press in either a first orientation or a second orientation which is offset by 180° from the first orientation, said passage means conducting lubricating liquid from said reservoir means to said outlet means during movement of said piston toward the extended position when said cushion asssembly is in either first orientation or the second orientation.

5. A cushion assembly as set forth in claim 1 wherein said cylinder has a cylindrical inner side surface which engages said piston and a cylindrical outer side surface which is coaxial with said inner side surface, said reservoir means including a cylindrical inner side surface which circumscribes and is spaced from the cylindrical outer side surface of said cylinder, said cylindrical inner side surface of said reservoir means and said cylindrical outer side surface of said cylinder cooperating to at least partially define a reservoir chamber having an annular cross sectional configuration and disposed in a coaxial relationship with said cylinder, said reservoir chamber being coextensive with said cylinder throughout a major portion of the axial extent of said cylinder.

6. A cushion assembly as set forth in claim 5 wherein said reservoir means includes an annular end surface connected with said cylindrical side surface and a standpipe extending from said annular end surface into the space between said cylindrical outer side surface of said cylinder and said cylindrical inner side surface of said reservoir means.

7. A cushion assembly as set forth in claim 6 wherein said standpipe has a central axis disposed radially outwardly of said cylindrical outer side surface of said cylinder at a location between said cylindrical outer side surface of said cylinder and said cylindrical inner side surface of said reservoir means.

8. A cushion for use in a press, said cushion assembly comprising a piston, a cylinder at least partially enclosing said piston, said piston and cylinder cooperating to at least partially define a variable volume working chamber which expands during operation of the press from a closed condition to an open condition and contracts during operation of the press from the open condition to the closed condition, said cylinder having a cylindrical inner side surface disposed in engagement with said piston and a cylindrical outer side surface which is coaxial with said inner side surface and said piston, a housing connected with and circumscribing said cylinder, said housing having a cylindrical inner side surface disposed in a coaxial relationship with and spaced from the cylindrical outer side surface of said cylinder, said inner side surface of said housing and said outer side surface of said cylinder cooperating to at least partially define an annular reservoir chamber which is coaxial with said cylinder, circumscribes said cylinder, and is coextensive with said cylinder for at least a major portion of the length of said cylinder, a standpipe disposed in said annular reservoir chamber and having a longitudinal axis which is parallel to the central axis of said cylinder and disposed on a radius of the cylindrical inner side surface of said housing at a location between the outer side surface of said cylinder and the inner side surface of said housing, and passage means for conducting a flow of lubricating liquid along a flow path from said standpipe to said working chamber during expansion of said working chamber and for conducting a flow of lubricating liquid from said working chamber back along the same flow path toward said reservoir chamber during contraction of said working chamber.

9. A cushion as set forth in claim 8 wherein said standpipe has an axial extent which is less than the axial extent of said annular reservoir chamber.

10. A cushion assembly as set forth in claim 8 wherein said standpipe has a cylindrical outer side surface which is spaced from the cylindrical outer side surface of said cylinder and the cylindrical inner side surface of said housing.

11. A cushion assembly as set forth in claim 8 wherein said cylinder and said housing cooperate to form axially opposite end walls of said annular reservoir chamber, said standpipe having a base end portion connected to a first one of said end walls of said annular reservoir chamber and an opposite end portion disposed adjacent to a second one of said end walls, said opposite end portion of said standpipe including surface means for defining an opening adjacent to the second one of said end walls.

* * * * *